A. D. SHAFFER.
TROLLEY HEAD AND GUARD.
APPLICATION FILED SEPT. 17, 1917.
1,276,128.
Patented Aug. 20, 1918.
2 SHEETS—SHEET 1.
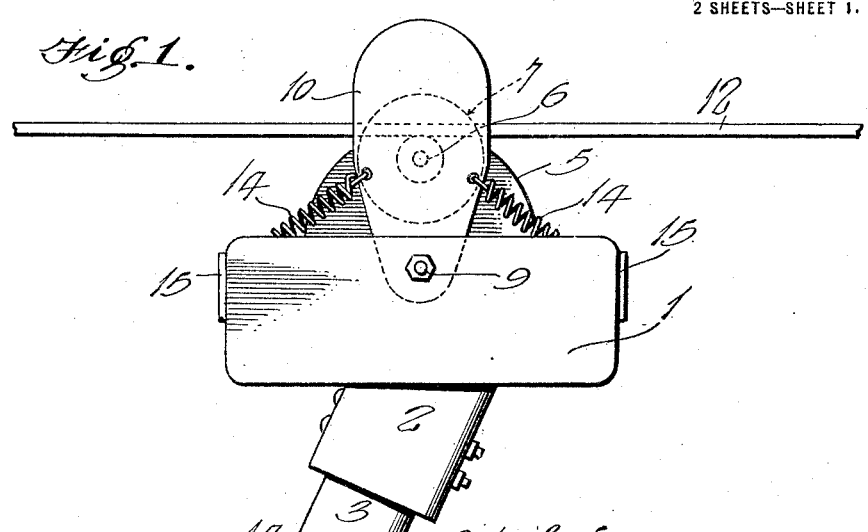
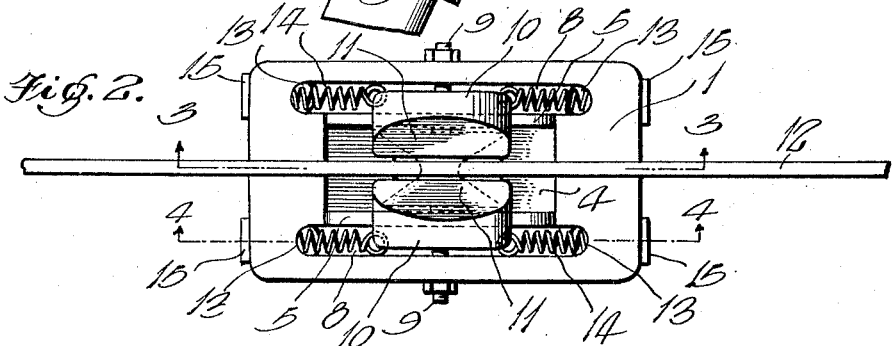
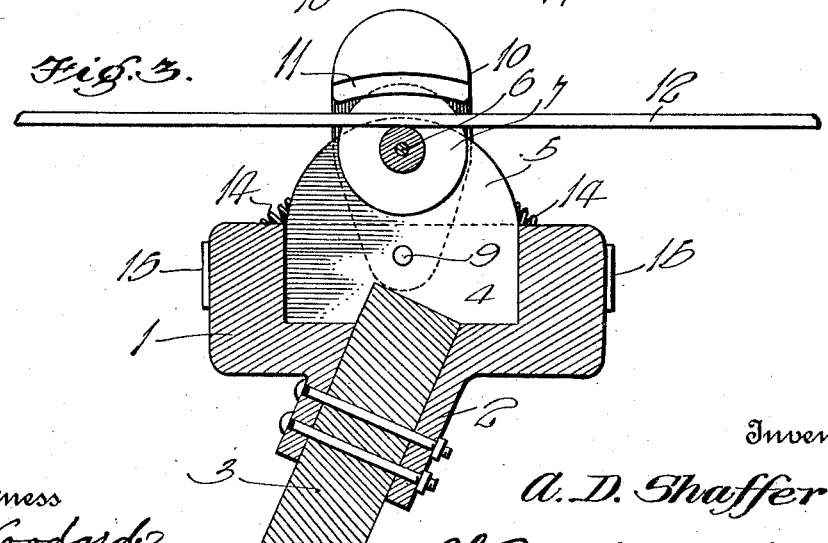

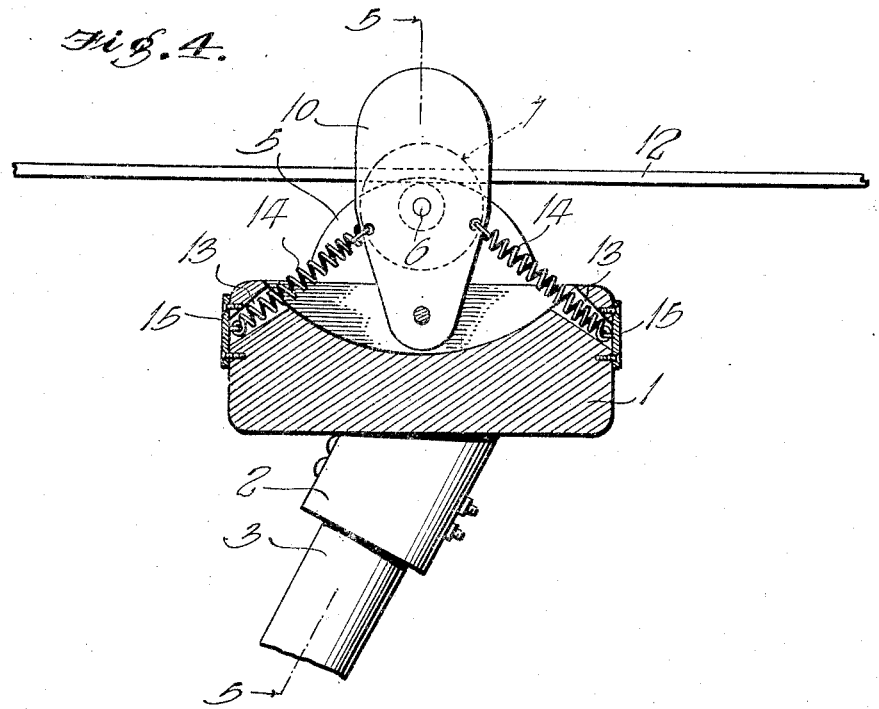
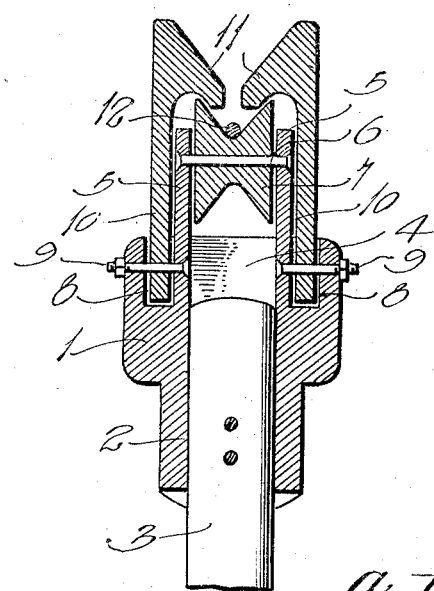

UNITED STATES PATENT OFFICE.

ABSALOM D. SHAFFER, OF KITTANNING, PENNSYLVANIA.

TROLLEY HEAD AND GUARD.

1,276,128.   Specification of Letters Patent.   Patented Aug. 20, 1918.

Application filed September 17, 1917. Serial No. 191,824.

*To all whom it may concern:*

Be it known that I, ABSALOM D. SHAFFER, a citizen of the United States, residing at Kittanning, in the county of Armstrong and State of Pennsylvania, have invented certain new and useful Improvements in Trolley Heads and Guards; and I do declare the following to be a full, clear, and exact description of the invention, such as will enable others skilled in the art to which it appertains to make and use the same.

This invention relates generally to appliances for electric railways, and more particularly to certain new and useful improvements in trolleys.

The primary object of the invention is to provide a pair of removable guards to prevent the trolley slipping off of the trolley wire, said guards yielding when the trolley passes under a cross wire. The guards are mounted independently of each other on both sides of the trolley wheel so that only one of them is required to yield as the trolley passes beneath a cross wire which extends only in one direction from the trolley wire, the other guard remaining in its normal upright position to prevent the trolley from slipping off of the wire.

A further object of the invention is to provide a new and improved form of trolley head.

A still further object of the invention is to improve upon devices of this general class by the provision of a comparatively simple, strong, durable and inexpensive construction, one which will be efficient and reliable in operation, and well adapted to the purpose for which it is designed.

With these and other objects in view, the invention consists of certain novel features of construction and the combination and arrangement of parts as will be hereinafter fully described and claimed.

In the accompanying drawings forming a part of the application and wherein the preferred form of the invention is clearly illustrated:—

Figure 1 is a side elevation of a device constructed in accordance with the present invention;

Fig. 2 is a top plan view of the same;

Figs. 3 and 4 are longitudinal sectional views taken substantially on the planes indicated by the lines 3—3 and 4—4 respectively of Fig. 2; and Fig. 5 is a transverse sectional view of the device taken substantially on the line 5—5 of Fig. 4.

In the structure shown in the drawings above briefly described, corresponding parts will be designated by similar reference characters and reference to the various elements will be herein made by their respective indicia. To this end, the numeral 1 designates a head which is preferably cast of metal, and which is of substantially rectangular shaped configuration. Projecting from the lower side of the head 1 is a tubular socket 2 adapted to receive the upper end of the trolley pole 3. The socket 2 is arranged angularly with respect to the head 1 so as to allow for the usual inclined position which the trolley pole 3 is to take when in use.

Arranged in the upper side of the head 1 and preferably centrally of the same is a rectangular shaped recess 4, and projecting upwardly from the head and arranged on opposite sides of the recess 4 is a pair of semi-circular plates 5. The inner sides of these plates 5 are formed as continuations of the side walls of the recess 4 as clearly shown in Fig. 5 of the drawings. The plates 5 are formed with apertures adjacent their upper edges, and through these apertures the axle 6 of the trolley wheel 7 is extended.

Arranged in the upper side of the head 1 and adjacent the side edges of the same are longitudinally extending recesses 8. If desired these recesses 8 may have their bottoms curved as clearly shown by Fig. 4 of the drawings, and they may also have their inner walls disposed in the planes of the outer sides of the plates 5 as shown by Fig. 5 of the drawings. Extending through the walls of the recesses 8 are bolts 9 which serve as pivots for a pair of guards 10. The lower ends of these guards 10 are thus disposed in the recesses 8, while their upper ends are provided with what may be termed lips 11 which extend or hook over the flanges of the trolley wheel 7. These lips 11 project toward each other and are only separated by a space sufficient to allow the trolley wire 12 to be passed between them.

Extending obliquely through the head 1 from the ends thereof into the recesses 8 are apertures 13, in which one of the ends of the coil springs 14 are disposed. These coil springs 14 have their above mentioned ends secured in any suitable manner to plates 15 which are secured to the ends of the head 1, while their other ends are connected to the guards 10. Thus it will be seen that each guard 10 is provided with a pair of opposing springs which serve to allow the guards to yield or swing in either direction and which retain it to its normal upright position after the guards become disengaged from their obstruction.

By providing a guard on each side of the trolley wheel, the trolley will not slip off of the trolley wire, and thus the common annoyance has been overcome. The guards may be moved independently of each other so that when the trolley passes under a switch or under a cross wire which extends in one direction only from the trolley wire, only one of the guards will be swung out of the way of the wire and the other guard will remain standing and prevent disengagement of the wheel from the trolley wire.

From the foregoing description, taken in connection with the accompanying drawings, the construction, use and operation of the device will be readily understood without a more extended explanation.

As various changes in form, proportion, and in the minor details of construction may be restorted to without departing from the spirit of this invention it is to be understood that I do not wish to be limited to the construction herein shown and described other than as claimed.

I claim:—

1. A device of the class described comprising a horizontally elongated head having a pair of upstanding plates between which the trolley wheel is mounted, said head having recesses in its upper side adjacent the outer sides of said plates, a pair of upstanding guards pivoted at their lower ends in said recesses and extending above the trolley wheel, and front and rear springs attached to said guard and to said head to retain the former yieldably in vertical position.

2. A device of the class described comprising a head having means for attachment to a trolley pole, a pair of spaced plates extending upwardly from the upper side of said head, a trolley wheel journaled between said plates, said head being provided with a pair of longitudinally extending recesses disposed along its side edges outwardly of said plates, and diagonal aperatures extending from the ends of said head into said recesses, a pair of guards having their lower ends disposed in said recesses and their upper ends provided with lips which hook over the flanges of said trolley wheel, bolts extending through the walls of said recesses and the lower ends of said guards to form pivots for the latter, and pairs of coil springs having one of their ends in said apertures and anchored to said head and the other ends connected to opposite edges of said guards to normally hold the same in an upright position.

3. A device of the class described comprising a head having a socket depending from the lower side thereof and adapted to receive the upper end of a trolley pole, a pair of spaced semi-circular plates extending upwardly from the upper side of said head, a trolley wheel journaled between said plates, said head being provided adjacent its side edges with a pair of longitudinally extending recesses, said recesses having their bottoms curved and their inner walls continued to form the outer sides of said plates, said head being provided with diagonal apertures which extend from the ends thereof to the ends of said recesses, a pair of guards having their lower ends disposed in said recesses and their upper ends provided with lips which hook over the flanges of said trolley wheel, bolts extending through the walls of said recesses and the lower ends of said guards to form pivots for the latter, plates secured to the ends of said head over the outer ends of said apertures, and pairs of coil springs having one of their ends disposed in said apertures and secured to the last named plates and their other ends connected to the opposite edges of said guards to hold the latter in upright position.

In testimony whereof I have hereunto set my hand in the presence of two subscribing witnesses.

ABSALOM D. SHAFFER.

Witnesses:
I. T. CAMPBELL,
JOHN C. ROBB.